United States Patent
Sridhar et al.

(10) Patent No.: US 9,369,771 B2
(45) Date of Patent: *Jun. 14, 2016

(54) APPARATUS AND METHOD FOR FILE SIZE ESTIMATION OVER BROADCAST NETWORKS

(75) Inventors: Avinash Sridhar, Plainsboro, NJ (US); David Anthony Campana, Princeton, NJ (US); Jill MacDonald Boyce, Manalapan, NJ (US); Shemimom M. Anthru, Monmouth Junction, NJ (US)

(73) Assignee: THOMSON LICENSING, Issy-les Moulineaux (FR)

( * ) Notice: Subject to any disclaimer, the term of this patent is extended or adjusted under 35 U.S.C. 154(b) by 490 days.

This patent is subject to a terminal disclaimer.

(21) Appl. No.: 12/735,110

(22) PCT Filed: Dec. 18, 2007

(86) PCT No.: PCT/US2007/025810
§ 371 (c)(1),
(2), (4) Date: Jun. 15, 2010

(87) PCT Pub. No.: WO2009/078839
PCT Pub. Date: Jun. 25, 2009

(65) Prior Publication Data
US 2010/0278178 A1 Nov. 4, 2010

(51) Int. Cl.
*H04L 12/56* (2006.01)
*H04N 21/61* (2011.01)
(Continued)

(52) U.S. Cl.
CPC ........... *H04N 21/6131* (2013.01); *H04H 20/40* (2013.01); *H04H 20/42* (2013.01);
(Continued)

(58) Field of Classification Search
CPC .................................................. H04N 21/435
USPC ............. 370/390, 431–433; 725/39; 709/203; 707/821–831
See application file for complete search history.

(56) References Cited

U.S. PATENT DOCUMENTS

| 5,202,755 A | 4/1993 | Yang et al. |
| 5,627,970 A | 5/1997 | Keshav |

(Continued)

FOREIGN PATENT DOCUMENTS

| CN | 1647517 | 7/2005 |
| CN | 1708985 | 12/2005 |

(Continued)

OTHER PUBLICATIONS

Search Report copy—dtd Sep. 18, 2008.
(Continued)

*Primary Examiner* — Ian N Moore
*Assistant Examiner* — Mewale Ambaye
(74) *Attorney, Agent, or Firm* — Brian J. Dorini; Catherine A. Cooper

(57) ABSTRACT

The apparatus and method for estimating the size of content being received before the actual transmission of the data utilizes Electronic Service Guide (ESG) information. The ESG information assists a client device in obtaining file information before the file is actually transmitted by the source of the same. In this manner, the power supply of the user device can be managed more efficiently and provide the user with the ability to make storage determinations at their user device before expending the power resources necessary to obtain (i.e., download) and store a particular file of interest to the user without requiring any user intervention.

6 Claims, 6 Drawing Sheets

(51) Int. Cl.
*H04H 20/40* (2008.01)
*H04H 20/42* (2008.01)
*H04H 20/57* (2008.01)
*H04H 40/27* (2008.01)
*H04H 60/72* (2008.01)
*H04N 21/235* (2011.01)
*H04N 21/414* (2011.01)
*H04N 21/433* (2011.01)
*H04N 21/434* (2011.01)
*H04N 21/435* (2011.01)
*H04N 21/442* (2011.01)
*H04H 60/27* (2008.01)

(52) U.S. Cl.
CPC .............. *H04H 20/57* (2013.01); *H04H 40/27* (2013.01); *H04H 60/72* (2013.01); *H04N 21/235* (2013.01); *H04N 21/41407* (2013.01); *H04N 21/435* (2013.01); *H04N 21/4334* (2013.01); *H04N 21/4345* (2013.01); *H04N 21/44209* (2013.01); *H04H 60/27* (2013.01)

(56) References Cited

U.S. PATENT DOCUMENTS

| | | | |
|---|---|---|---|
| 5,675,384 A | 10/1997 | Ramamurthy et al. | |
| 5,802,106 A | 9/1998 | Packer | |
| 5,892,915 A | 4/1999 | Duso et al. | |
| 5,974,503 A | 10/1999 | Venkatesh et al. | |
| 5,987,621 A | 11/1999 | Duso et al. | |
| 6,014,694 A | 1/2000 | Aharoni et al. | |
| 6,026,082 A | 2/2000 | Astrin | |
| 6,230,200 B1 | 5/2001 | Forecast et al. | |
| 6,275,990 B1 | 8/2001 | Dapper et al. | |
| 6,289,382 B1 | 9/2001 | Bowman-Amuah | |
| 6,298,456 B1 | 10/2001 | O'Neil et al. | |
| 6,332,163 B1 | 12/2001 | Bowman-Amuah | |
| 6,339,832 B1 | 1/2002 | Bowman-Amuah | |
| 6,356,945 B1 | 3/2002 | Shaw et al. | |
| 6,434,568 B1 | 8/2002 | Bowman-Amuah | |
| 6,434,628 B1 | 8/2002 | Bowman-Amuah | |
| 6,438,594 B1 | 8/2002 | Bowman-Amuah | |
| 6,442,748 B1 | 8/2002 | Bowman-Amuah | |
| 6,473,794 B1 | 10/2002 | Guheen et al. | |
| 6,477,580 B1 | 11/2002 | Bowman-Amuah | |
| 6,477,665 B1 | 11/2002 | Bowman-Amuah | |
| 6,496,850 B1 | 12/2002 | Bowman-Amuah | |
| 6,502,213 B1 | 12/2002 | Bowman-Amuah | |
| 6,507,872 B1 | 1/2003 | Geshwind | |
| 6,519,571 B1 | 2/2003 | Guheen et al. | |
| 6,529,909 B1 | 3/2003 | Bowman-Amuah | |
| 6,529,948 B1 | 3/2003 | Bowman-Amuah | |
| 6,536,037 B1 | 3/2003 | Guheen et al. | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,571,282 B1 | 5/2003 | Bowman-Amuah | |
| 6,578,068 B1 | 6/2003 | Bowman-Amuah | |
| 6,601,192 B1 | 7/2003 | Bowman-Amuah | |
| 6,601,234 B1 | 7/2003 | Bowman-Amuah | |
| 6,606,660 B1 | 8/2003 | Bowman-Amuah | |
| 6,611,812 B2 | 8/2003 | Hurtado et al. | |
| 6,615,166 B1 | 9/2003 | Guheen et al. | |
| 6,615,199 B1 | 9/2003 | Bowman-Amuah | |
| 6,615,253 B1 | 9/2003 | Bowman-Amuah | |
| 6,625,750 B1 | 9/2003 | Duso et al. | |
| 6,636,242 B2 | 10/2003 | Bowman-Amuah | |
| 6,640,238 B1 | 10/2003 | Bowman-Amuah | |
| 6,640,244 B1 | 10/2003 | Bowman-Amuah | |
| 6,640,249 B1 | 10/2003 | Bowman-Amuah | |
| 6,697,365 B1 | 2/2004 | Messenger | |
| 6,715,145 B1 | 3/2004 | Bowman-Amuah | |
| 6,721,437 B1 | 4/2004 | Ezaki et al. | |
| 6,721,713 B1 | 4/2004 | Guheen et al. | |
| 6,725,267 B1 | 4/2004 | Hoang | |
| 6,742,015 B1 | 5/2004 | Bowman-Amuah | |
| 6,834,110 B1 | 12/2004 | Marconcini et al. | |
| 6,842,906 B1 | 1/2005 | Bowman-Amuah | |
| 6,901,051 B1 | 5/2005 | Hou et al. | |
| 6,957,186 B1 | 10/2005 | Guheen et al. | |
| 6,983,371 B1 | 1/2006 | Hurtado et al. | |
| 7,110,984 B1 | 9/2006 | Spagna et al. | |
| 7,149,698 B2 | 12/2006 | Guheen et al. | |
| 7,165,041 B1 | 1/2007 | Guheen et al. | |
| 7,177,429 B2 | 2/2007 | Moskowitz et al. | |
| 7,188,085 B2 | 3/2007 | Pelletier | |
| 7,213,005 B2 | 5/2007 | Mourad et al. | |
| 7,219,145 B2 | 5/2007 | Chmaytelli et al. | |
| 7,228,437 B2 | 6/2007 | Spagna et al. | |
| 7,260,309 B2 | 8/2007 | Gutta | |
| 7,269,564 B1 | 9/2007 | Milsted et al. | |
| 7,310,823 B2 | 12/2007 | Okamoto et al. | |
| 7,478,206 B2 * | 1/2009 | Nakamura et al. | 711/154 |
| 7,568,079 B2 | 7/2009 | Horiuchi et al. | |
| 8,081,955 B2 * | 12/2011 | Davis et al. | 455/414.1 |
| 8,433,181 B2 | 4/2013 | Jeong et al. | |
| 2001/0044835 A1 | 11/2001 | Schober et al. | |
| 2002/0010684 A1 | 1/2002 | Moskowitz | |
| 2002/0013156 A1 | 1/2002 | Yamamoto et al. | |
| 2002/0026501 A1 | 2/2002 | Hoang | |
| 2002/0078357 A1 | 6/2002 | Breukers et al. | |
| 2002/0175998 A1 | 11/2002 | Hoang | |
| 2003/0007507 A1 | 1/2003 | Rajwan et al. | |
| 2003/0051249 A1 | 3/2003 | Hoang | |
| 2003/0058277 A1 | 3/2003 | Bowman-Amuah | |
| 2003/0105718 A1 | 6/2003 | Hurtado et al. | |
| 2003/0135464 A1 | 7/2003 | Mourad et al. | |
| 2003/0195863 A1 | 10/2003 | Marsh | |
| 2003/0225777 A1 | 12/2003 | Marsh | |
| 2003/0229549 A1 | 12/2003 | Wolinsky et al. | |
| 2004/0003413 A1 | 1/2004 | Boston et al. | |
| 2004/0034712 A1 | 2/2004 | Rajwan et al. | |
| 2004/0045030 A1 | 3/2004 | Reynolds et al. | |
| 2004/0052504 A1 | 3/2004 | Yamada et al. | |
| 2004/0091235 A1 | 5/2004 | Gutta | |
| 2004/0092228 A1 | 5/2004 | Force et al. | |
| 2004/1010712 | 6/2004 | Guheen et al. | |
| 2004/0148631 A1 | 7/2004 | Zubowicz | |
| 2004/0163121 A1 | 8/2004 | Hyun | |
| 2004/0250291 A1 | 12/2004 | Rao et al. | |
| 2005/0135779 A1 | 6/2005 | Garrison et al. | |
| 2005/0144284 A1 | 6/2005 | Ludwig et al. | |
| 2005/0229222 A1 | 10/2005 | Relan et al. | |
| 2005/0238315 A1 | 10/2005 | Kataoka | |
| 2005/0240756 A1 | 10/2005 | Mayer | |
| 2005/0259682 A1 | 11/2005 | Yosef et al. | |
| 2005/0289616 A1 | 12/2005 | Horiuchi et al. | |
| 2005/0289635 A1 | 12/2005 | Nakamura et al. | |
| 2006/0047775 A1 | 3/2006 | Bruck et al. | |
| 2006/0053077 A1 | 3/2006 | Mourad et al. | |
| 2006/0064716 A1 | 3/2006 | Sull et al. | |
| 2006/0085343 A1 | 4/2006 | Lisanke et al. | |
| 2006/0095792 A1 | 5/2006 | Hurtado et al. | |
| 2006/0095944 A1 | 5/2006 | Demircin et al. | |
| 2006/0107289 A1 | 5/2006 | Deyonker et al. | |
| 2006/0159109 A1 | 7/2006 | Lamkin et al. | |
| 2006/0161635 A1 | 7/2006 | Lamkin et al. | |
| 2006/0161949 A1 | 7/2006 | Tsukamoto | |
| 2006/0184977 A1 | 8/2006 | Mueller et al. | |
| 2006/0218218 A1 | 9/2006 | Ganesan et al. | |
| 2006/0242091 A1 | 10/2006 | Jansky | |
| 2006/0242672 A1 | 10/2006 | Narayanan et al. | |
| 2006/0285508 A1 | 12/2006 | Vermola et al. | |
| 2007/0016927 A1 | 1/2007 | Robey et al. | |
| 2007/0104457 A1 * | 5/2007 | Jeong et al. | 386/83 |
| 2007/0128899 A1 | 6/2007 | Mayer | |
| 2007/0130023 A1 | 6/2007 | Wolinsky et al. | |
| 2007/0130589 A1 | 6/2007 | Davis et al. | |
| 2007/0153731 A1 | 7/2007 | Fine et al. | |
| 2007/0153910 A1 | 7/2007 | Levett | |
| 2007/0192482 A1 | 8/2007 | Smith et al. | |
| 2007/0201823 A1 | 8/2007 | Kang | |
| 2007/0211720 A1 | 9/2007 | Fuchs et al. | |

(56) References Cited

U.S. PATENT DOCUMENTS

| | | | |
|---|---|---|---|
| 2007/0237402 A1 | 10/2007 | Dekel et al. | |
| 2008/0040760 A1* | 2/2008 | Cho et al. | 725/87 |
| 2009/0204992 A1 | 8/2009 | Boyce et al. | |
| 2010/0130122 A1 | 5/2010 | Sridhar et al. | |
| 2010/0138870 A1 | 6/2010 | Anthru et al. | |
| 2010/0138871 A1 | 6/2010 | Anthru et al. | |
| 2010/0257572 A1 | 10/2010 | Sridhar et al. | |
| 2013/0219440 A1 | 8/2013 | Sridhar et al. | |

FOREIGN PATENT DOCUMENTS

| | | |
|---|---|---|
| CN | 1723474 | 1/2006 |
| CN | 1751470 | 3/2006 |
| EP | 1077398 | 2/2001 |
| EP | 1107137 | 6/2001 |
| EP | 1487204 | 12/2004 |
| EP | 1622341 | 2/2006 |
| EP | 1693981 | 8/2006 |
| EP | 1909283 | 4/2008 |
| GB | 2405557 | 3/2005 |
| GB | 2434463 | 7/2007 |
| JP | 8022653 | 1/1996 |
| JP | 2000228081 | 8/2000 |
| JP | 2003046974 | 2/2003 |
| JP | 2003085880 | 3/2003 |
| JP | 2004048718 | 2/2004 |
| JP | 2004516693 | 6/2004 |
| JP | 2004220696 | 8/2004 |
| JP | 2004-533781 | 11/2004 |
| JP | 2004350316 | 12/2004 |
| JP | 2005-346824 | 12/2005 |
| JP | 2006053633 | 2/2006 |
| JP | 2006054022 | 2/2006 |
| JP | 2006505994 | 2/2006 |
| JP | 2006115224 | 4/2006 |
| JP | 2006129265 | 5/2006 |
| JP | 2007110395 | 4/2007 |
| JP | 2007274066 | 10/2007 |
| JP | 2007274443 | 10/2007 |
| JP | 2007312365 | 11/2007 |
| KR | 20010020498 | 3/2001 |
| KR | 20040061254 | 7/2004 |
| KR | 20070063086 | 6/2007 |
| WO | WO 94/01824 | 1/1994 |
| WO | WO9900984 | 1/1999 |
| WO | WO 00/07314 | 2/2000 |
| WO | WO 00/51310 | 8/2000 |
| WO | WO 00/73928 | 12/2000 |
| WO | WO 00/73929 | 12/2000 |
| WO | WO 00/73930 | 12/2000 |
| WO | WO 00/73955 | 12/2000 |
| WO | WO 00/73956 | 12/2000 |
| WO | WO 00/73957 | 12/2000 |
| WO | WO 00/73958 | 12/2000 |
| WO | WO0073956 | 12/2000 |
| WO | WO 01/16668 | 3/2001 |
| WO | WO 01/16704 | 3/2001 |
| WO | WO 01/16705 | 3/2001 |
| WO | WO 01/16706 | 3/2001 |
| WO | WO 01/16723 | 3/2001 |
| WO | WO 01/16724 | 3/2001 |
| WO | WO 01/16726 | 3/2001 |
| WO | WO 01/16727 | 3/2001 |
| WO | WO 01/16728 | 3/2001 |
| WO | WO 01/16729 | 3/2001 |
| WO | WO 01/16733 | 3/2001 |
| WO | WO 01/16734 | 3/2001 |
| WO | WO 01/16735 | 3/2001 |
| WO | WO 01/16739 | 3/2001 |
| WO | WO 01/17139 | 3/2001 |
| WO | WO 01/17194 | 3/2001 |
| WO | WO 01/17195 | 3/2001 |
| WO | WO0116729 | 3/2001 |
| WO | WO0116733 | 3/2001 |
| WO | WO 01/43026 | 6/2001 |
| WO | WO 01/46846 | 6/2001 |
| WO | WO 01/57667 | 8/2001 |
| WO | WO0189176 | 11/2001 |
| WO | WO 01/93060 | 12/2001 |
| WO | WO0203682 | 1/2002 |
| WO | WO 02/11364 | 2/2002 |
| WO | WO0211364 | 2/2002 |
| WO | WO 02/39744 | 5/2002 |
| WO | WO 02/087246 | 10/2002 |
| WO | 02/104028 A1 | 12/2002 |
| WO | WO 03/017553 | 3/2003 |
| WO | WO 03/027876 | 4/2003 |
| WO | WO 03/043204 | 5/2003 |
| WO | WO 03/048894 | 6/2003 |
| WO | WO2004045104 | 5/2004 |
| WO | WO2004053757 | 6/2004 |
| WO | WO2004063892 | 7/2004 |
| WO | WO2004107747 | 12/2004 |
| WO | WO2005015913 | 2/2005 |
| WO | WO 2005/022791 | 3/2005 |
| WO | WO 2005/032026 | 4/2005 |
| WO | WO 2006/066052 | 6/2006 |
| WO | WO 2007/078252 | 7/2007 |
| WO | WO 2007/078253 | 7/2007 |
| WO | WO2008033136 | 3/2008 |
| WO | WO2008147367 | 12/2008 |
| WO | WO2009020492 | 2/2009 |
| WO | WO2009020493 | 2/2009 |

OTHER PUBLICATIONS

P. Kjeldsberg et al.: "Data Dependency Size Estimation for Use in Memory Optimization" IEEE Trans. on Computer Aided Design of Integrated Circuits & Sys., vol. 22, No. 7, Jul. 2003, pp. 908-921.

Q. Hu et al.: "A Comparison of Indexing Methods for Data Broadcast on the Air", IEEE Publication, Published Jan. 21-23, 1998, pp. 1-4.

Lo et al.: "Optimal Index and Data Allocation in Multiple Broadcast Channels", Data Engineering Conference Publication Feb. 29-Mar. 3, 200, pp. 293-302.

A. Salkintzis et al.: "An Outband Paging Protocol for Energy Efficient Mobile Communications"; IEEETransactions on Broadcasting Sep. 2002, vol. 48, Issue 3. pp. 246-256.

Handley, M., et al., "SDP: Session Description Protocol," RFC 4566, The Internet Society, Jul. 2006, pp. 1-49.

Paila, T., et al., "Flute—File Delivery over Unidirectional Transport,", RFC 3926, Oct. 2004, pp. 1-35.

IP Datacast over DVB-H: Electronic Service Guide (ESG), "DVB Digital Video Broadcasting", DVB Document A099, Nov. 2005, 89 pgs.

The TV-Anytime Forum, "Specification Series: S-3 On: Metadata (Normative) Part A: Metadata Schemas," SP003v13 Part A, Dec. 15, 2002, 161 pgs.

Wikipedia, "Electronic Program Guide," No date (http://en.wikipedia.org/wiki/EPG, accessed Aug. 16, 2013).

International Search Report for PCT/US2007/025810 dated Sep. 10, 2008.

Office Action for U.S. Appl. No. 12/310,506 dated Mar. 22, 2012.

Tong et al.:"Blind and Semiblind Channel Equalization for Wireless Broadcast Channels," Cornell University Itheca, NY, IEEE, Oct. 2, 2007, p. 595.

Sooncheon et al., "An Effective Resource Management for Variable Bit Rate Video-On-Demand Server," 1997 IEEE, Sep. 1, 1997.

Pu et al., "Fine-Grain Adaptive Compression in Dynamically Variable Networks," Proceedings of the 25th IEEE International Conference on Distributed Computing Systems (ICSCS'05), 2005 IEEE, Jun. 6, 2005.

Gubbi, "Multimedia Streams and Quality of Service in the Next Generation Wireless Home," 1999 IEEE, Nov. 15, 1999.

Knappmeyer et al., "Adaptative Data Scheduling for Mobile Carousel Services", IEEE Publication. Apr. 22, 2007.

Non-final rejection dated Mar. 23, 2012.

WIPO SR dated Sep. 24, 2008.

SR Eng TR dated Jul. 9, 2012.

SR original dated Jul. 9, 2012.

(56) References Cited

OTHER PUBLICATIONS

Related U.S. Appl. No. 13/852,290 Notice of Allowance dated Aug. 5, 2014.
Related U.S. Appl. No. 13/852,290 Notice of Allowance dated Dec. 10, 2014.
US DIV Notice of Allowance for Related U.S. Appl. No. 13/852,290 dated Oct. 27, 2015.
Jean-Pierre Evain et al., "TV-Anytime Phase 1—a decisive milestone in open standards for Personal Video recorders," EBU Technical Review, Jul. 2003.

* cited by examiner

APPARATUS AND METHOD FOR FILE SIZE ESTIMATION OVER BROADCAST NETWORKS

This application claims the benefit, under 35 U.S.C. §365 of International Application PCT/US2007/025,810, filed 18 Dec. 2007, which was published in accordance with PCT Article 21(2) on 25 Jun. 2009, in English.

BACKGROUND

1. Technical Field

The present invention relate to broadcast networks. More particularly, they relate to estimating file size before receiving the same.

2. Description of Related Art

Broadcast technologies, such as DVB-H, enable delivery of data to low-power, portable client devices, which in turn enables content on demand services. In such services, content is continually received at a client and may be consumed by the end user immediately or consumed at a later time. In some cases, the amount of content that is stored is limited by the storage capacity of the client. When a service provides frequent content updates, it is desirable to enable quick storage and replacement of received data. In such services estimating the size of content being received before the actual transmission of the data can be helpful in replacing already stored content or deciding what content will be stored in the future.

SUMMARY

According to an aspect of the present principles, the method for file size estimation over a communication channel in a broadcast network includes estimating file size using broadcast schedule information before actually receiving the file, and determining whether or not to receive and store the file before downloading the same to a client device automatically and/or without requiring user intervention. This determination is based on user preferences stored in a user profile on the client device. The method can further include determining the bandwidth of the communication channel.

The file size estimation can be determined by deriving start and end times of the file from the broadcast schedule. In another implementation, the file size estimation uses electronic service guide (ESG) information relating to the file from a service provider.

The bandwidth determinations can be performed by estimation, or by obtaining previously known values for the bandwidth of the communication channel.

According to another aspect of the present principles, the apparatus includes a mobile client device having a memory contained therein and being configured to estimate a file size using broadcast scheduled information before actually receiving the file, and to automatically determine whether or not to receive and store the file before downloading the same to the memory of the device automatically and/or without requiring user intervention.

The mobile client device is further configured to determine the bandwidth of a communication channel over which the file is to be transmitted to the mobile device.

A user profile stored in the memory of the client device enables the client device to make the automatic determination without user requiring intervention.

According to another implementation of the present principles, the apparatus includes a mobile client device having a memory contained therein. The memory includes a computer program product comprising readable program code embodied thereon for use in operating the mobile client device. The program product includes program code for estimating a file size using broadcast schedule information before actually receiving the file, and program code for determining whether or not to receive and store the file before downloading the same to the mobile client device without user intervention. The client device further includes program code for determining storage space limitations on the client device using the estimated file size. This determination is made based on stored preferences in the user profile stored in the memory of the client device.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

Figure 1:
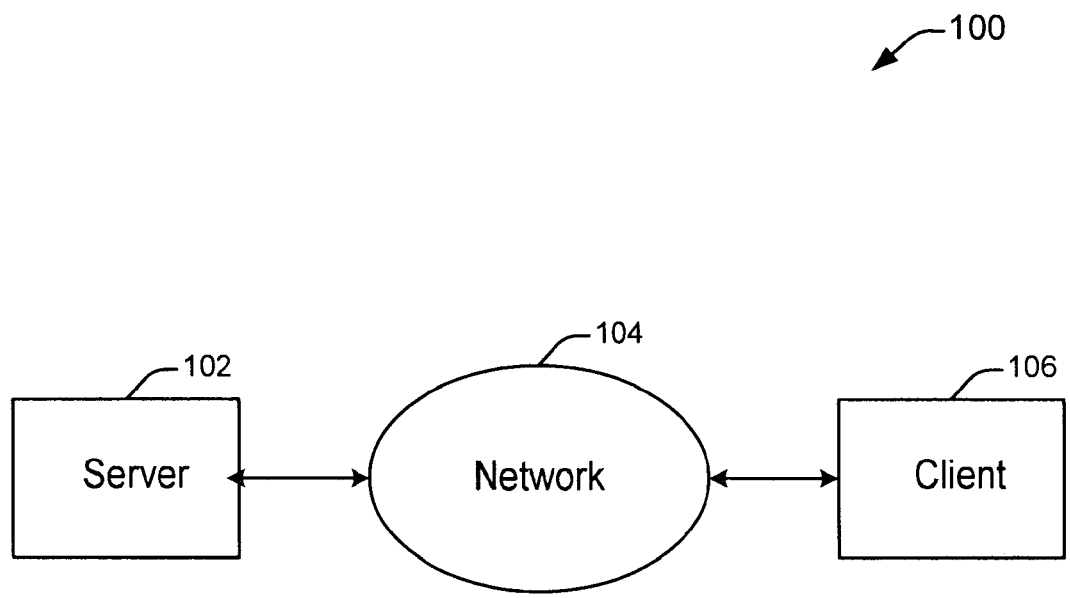
FIG. 1 is block diagram of a bi-directional broadcast network scenario according to known implementations.

There are known methods to estimate the instantaneous bandwidth of a given channel. This is usually done on a bi-directional point-to-point network by measuring the amount of time it takes to acquire a known quantity of data. FIG. 1 shows an example of a bi-directional point to point network 100 where both the server 102 and client 106 are in bi-directional communication with each other via the network 104.

In most bi-directional client-server network architectures, a client requests a known quantity of data and records the start time and the end time of data transmission through a series of network packets going back and forth between the server and the client, to estimate channel capacity.

Figure 2:
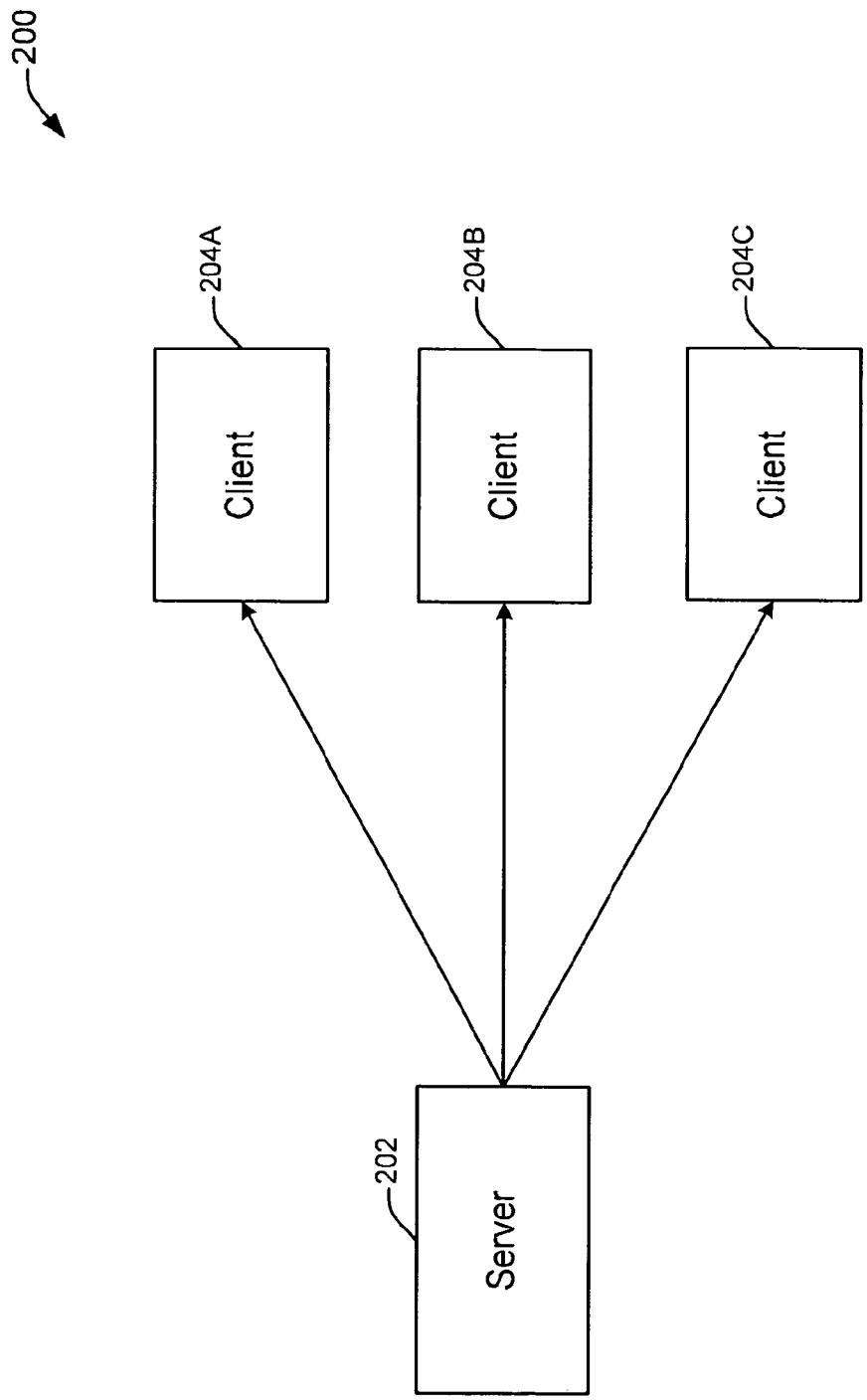
FIG. 2 is a block diagram of a uni-directional broadcast network according to known implementations.

FIG. 2 shows an example of a uni-directional client/server architecture 200 where the server 202 transmits data to one or more clients 204a-c.

File Delivery can be performed using File Delivery over Unidirectional Transport (FLUTE) protocol. FLUTE is a protocol for multicast file delivery, and can be used to transmit data or content over uni-directional networks. A client can monitor the amount of data flowing at any particular time and use this information to estimate the channel capacity. In a constant capacity channel environment, this measurement could be done only once. In a variable channel, a best effort of the channel capacity (i.e., bandwidth) can be maintained and constantly updated.

A personalized broadcast video system provides a simple user interface for personalization, while efficiently using network bandwidth and minimizing receiver device battery usage. A user profile on a receiver device indicates the interests of the user. Individual clips to be broadcast are associated with flexible metadata tags, such as keywords, sent in an Electronic Service Guide (ESG). The ESG contains information about television programs scheduled for broadcast, and typically includes descriptive data, or metadata, about individual programs, such as the name of the program, a synopsis, actors, director, etc., as well as the scheduled time, date, duration and channel for broadcast.

The DVB-CBMS standard enables a service for broadcasting of multimedia content files, such as compressed video or audio files, using DVB-H. The DVB-H ESG provides a standardized ESG, which builds upon TV-Anytime or On-demand programming. In the DVB-H ESG, individual pieces of content are uniquely identified by the ContentID attribute of the content fragment.

In cases where a service of personalized broadcast video system is provided, content is continually broadcast and based on client preferences, content is received and stored. However, in such cases the client tends to be switched on all the time and hence results in inefficient power usage. Power management would be more efficient if the client only switched power on for reception of preferred content. In order to do this, however, the client has to decide which content can be saved based on local storage limitations, before the content is actually broadcast. According to an implementation of the present principles, this decision is established in the user profile preferences stored in the client device so that no user intervention is required.

The DVB-H ESG advertises the use of a file size parameter in the Acquisition fragment in the ComponentCharacteristic type named FileDownloadComponentCharacteristic under the Storage identifier. However, this only measures the file size as in megabytes and this granularity is not sufficient for providing advance notice of the content before actual broadcast.

As mentioned above, in unidirectional or broadcast networks there is no feedback from a client. The client only receives data that is broadcast. In such scenarios, the client can estimate bandwidth by passively monitoring the data packets. In order to make estimates of the file size of the content that is going to be broadcast, an estimated value of the bandwidth of the channel is required. This can be done by using a statistical table of sampled bandwidth over time or any other method of bandwidth estimation.

One example of estimating the bandwidth is by using the "b=" identifier specified in the Session Description Protocol (SDP) file. The SDP file contains a set of identifiers that associate with the acquisition of content.

In another example, a client could timestamp the start of a packet transmission and after a period of time, derive how much data was received. This would then help the client get an estimate of the bandwidth of the channel, where Bandwidth of the Channel=Number of bytes received/Time.

Another method of estimating bandwidth would be by using server provided data to the client. For example by using the DVB-H ESG specification, the Storage identifier can be used as a rough estimate of the file size of a content file going to be broadcast. This rough estimate, along with the start time and end time of broadcast from the already received schedule ESG fragment on the client device, can be used to estimate the bandwidth over an initial period of time. This is particularly useful in situations where the bandwidth of the channel is variable. The client device can use this method to estimate the approximate bandwidth. The client can also use this method to calculate the error in its estimates. For example once the whole file has been downloaded the, actual size of the file is known and this can be used to recalculate the bandwidth and hence adjust the estimating parameters so that future estimates are more accurate.

A file download service may be defined as a service that provides content for download in the form of files. These files are consumed at the receiver application and presented to the user. Providers of this service need to be sensitive about client device power and storage needs. Content is continually being broadcast and new content is stored on the client device while old ones are replaced. Replacing of old content must be time, as well as power sensitive. Knowing the content file sizes in advance, a client device can make intelligent choices when replacing content on the device and at the same time make better reception power management.

Once the bandwidth has been estimated the size of content to be broadcast can be estimated.

Figure 3:
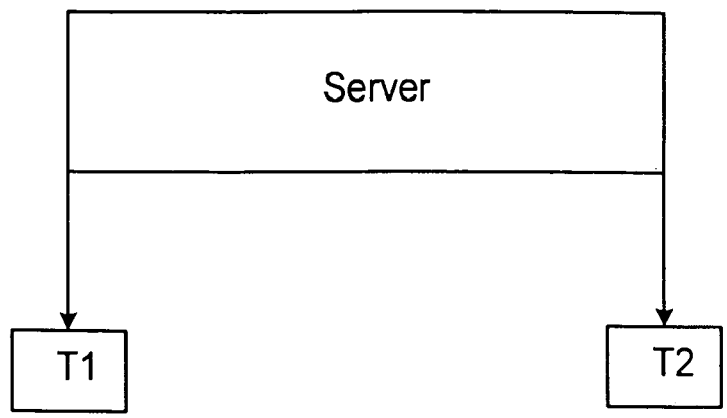
FIG. 3 is diagrammatic representation of a clip and times at which the clip is to be broadcast.
Figure 4:
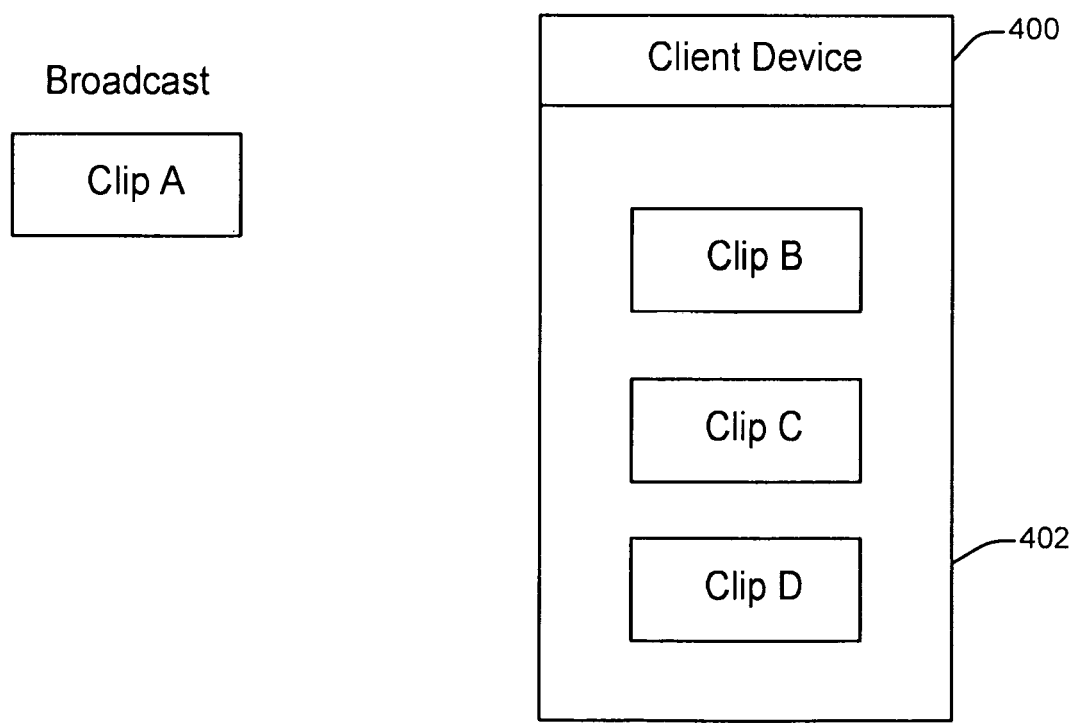
FIG. 4 is diagrammatic representation of clip A to be broadcast and several clips stored in a client device.

Referring to FIGS. 3 and 4, consider a scenario where Clip A is going to be broadcast at some time in the near future T1 and a client device 400 contains stored file content Clips B, C and D in an memory area 402 of the client device. The broadcast time of Clip A is available to the client by parsing the schedule ESG information it received from an earlier received transmission. The receiver (client device 400) has to make a decision on whether or not to store Clip A. For purposes of this example, we assume the Clips B, C and D together take up a good percentage of the storage space on the device. The memory area 402 in this example can be any type of known memory for storing content, and or programming information relating to the operation of the client device. In one implementation, the memory 402 contains the programming to implement the methods and processes of the present principles disclosed herein.

The client device 400 uses the size of Clip A to make a decision whether to store the clip. Using the estimated file size of Clip A, the client can make the decision in advance to either store or not store Clip A. For example without knowing the actual size of Clip A the client device would switch on at time $T_1$ and receive whole of Clip A. After completion of the file download (at time $T_2$), the file size of the clip is known. Based on this file size and other characteristics of the Clip A (e.g. keywords etc.), the client device can either store Clip A and replace some existing content (Clip B, C and D) or discard Clip A. Discarding Clip A after having used the power to receive it, is wasteful in terms of power usage and hence reduces battery life.

Using the estimated file size of Clip A, the client device can make the decision in advance to either store or not store Clip A. The device does not have to be switched on during the broadcast of Clip A if it decides it doesn't need to store the clip, thereby reducing the power usage of the device by shutting off its reception components for that period.

Figure 5:
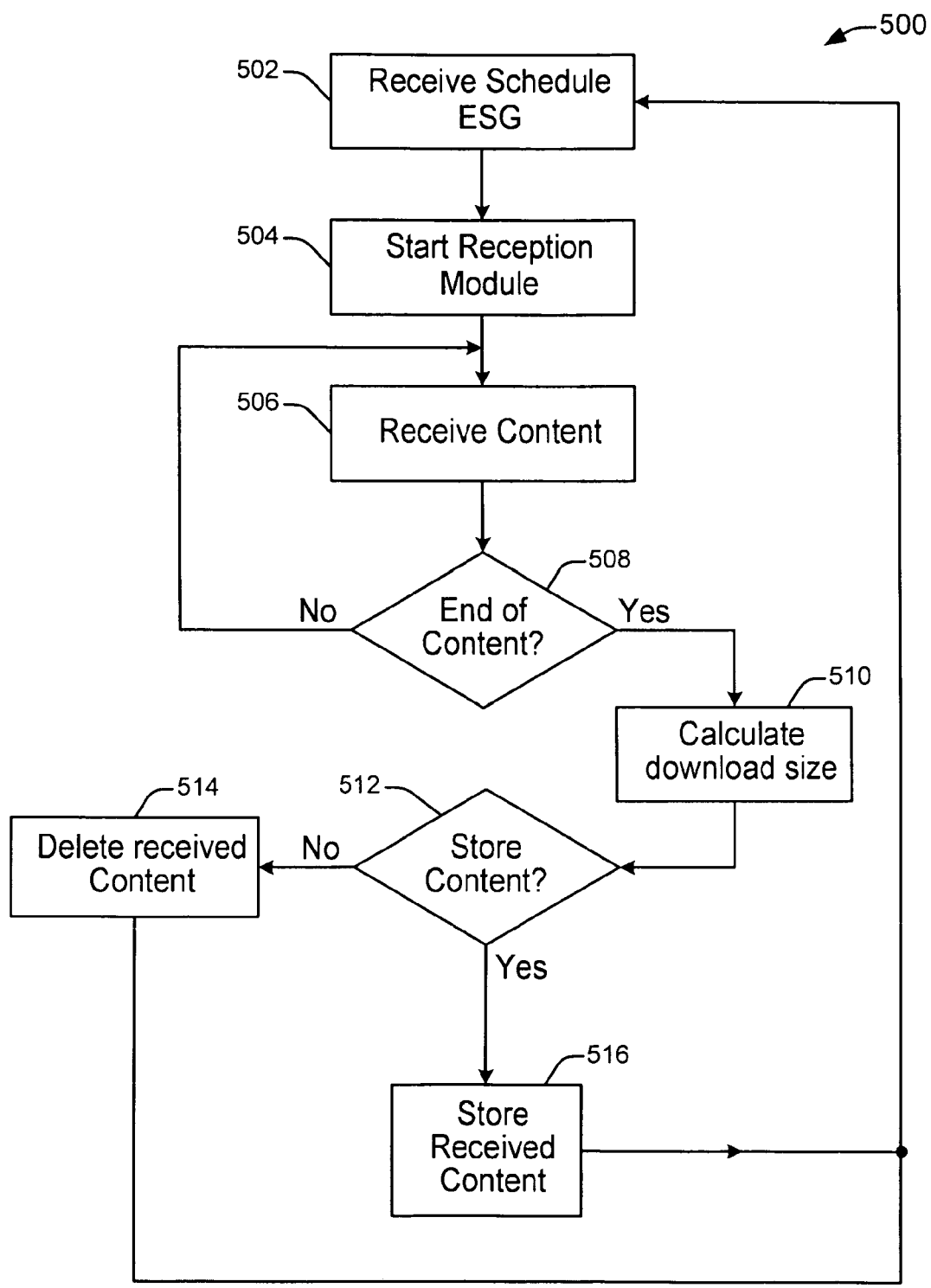
FIG. 5 is flow diagram of the method for file size estimation according to an implementation of the present principles.

Referring to FIG. 5, there is shown the method 500 where the reception module (or client device) needs to be switched on regardless of whether the content was going to be stored or not. This is primarily due to the fact that the reception module 504 is started immediately after the ESG schedule is received 502. The content is received (506), and a determination is made (508) whether the receiving of the content has ended. When the content is fully received, the downloaded size is calculated 510, and the client device decides whether to store the content (512). If no, the received content is deleted (514) and the device returns to the receive schedule state. If yes, the received content is stored (516) and the device returns to the receive schedule state. As mentioned above, this method requires the client or user device to be powered on and in reception mode at all times, and may result in an inefficient use of battery power, especially when the user determines to delete the received content, after complete reception.

Figure 6A:
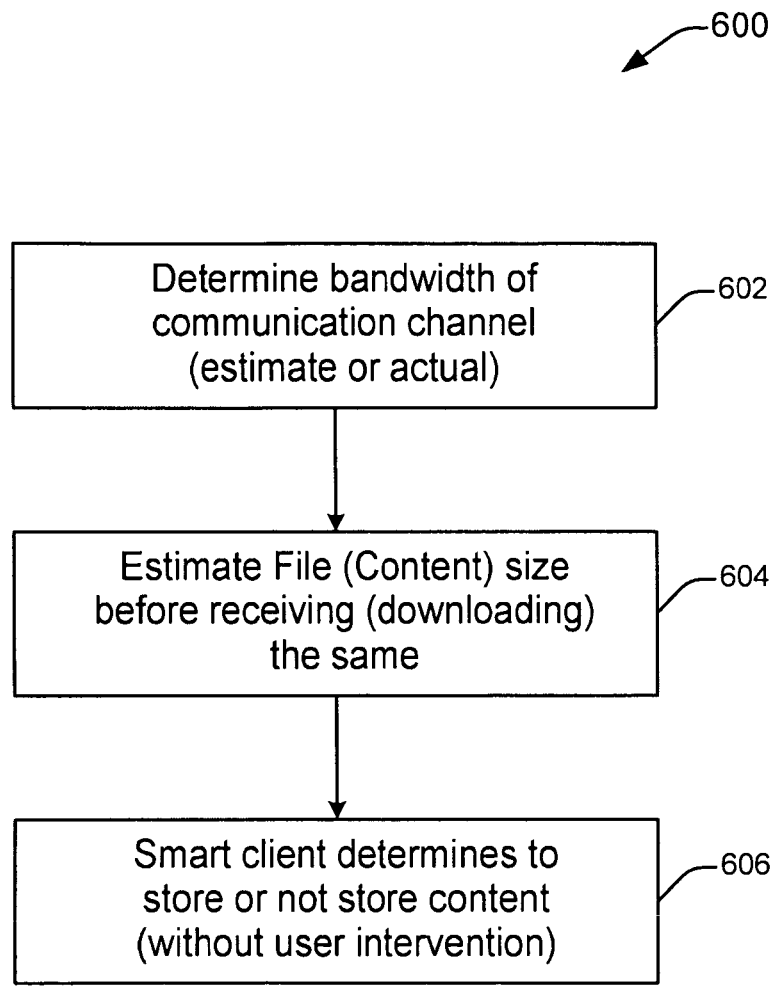
FIG. 6a is block diagram of the method according to an implementation of the present principles.

FIG. 6a shows the method 600 according to an implementation of the present principles, where power usage at the client device is more efficiently managed. Initially, the bandwidth of the communication channel is determined (602). As mentioned above, this determination can be either an actual, known BW, or can be estimated using any suitable known method for estimating the bandwidth of the channel. Once the bandwidth is known, the file (content) size can be estimated (604) using the previously received ESG information. When the file size has been determined, or estimated, the smart client device can determine (606) whether or not to download (store) the file (content) at the client device without requiring the user's intervention. This determination is made base on the user preferences previously established by the user in the user profile stored in the memory of the client device.

Figure 6B:
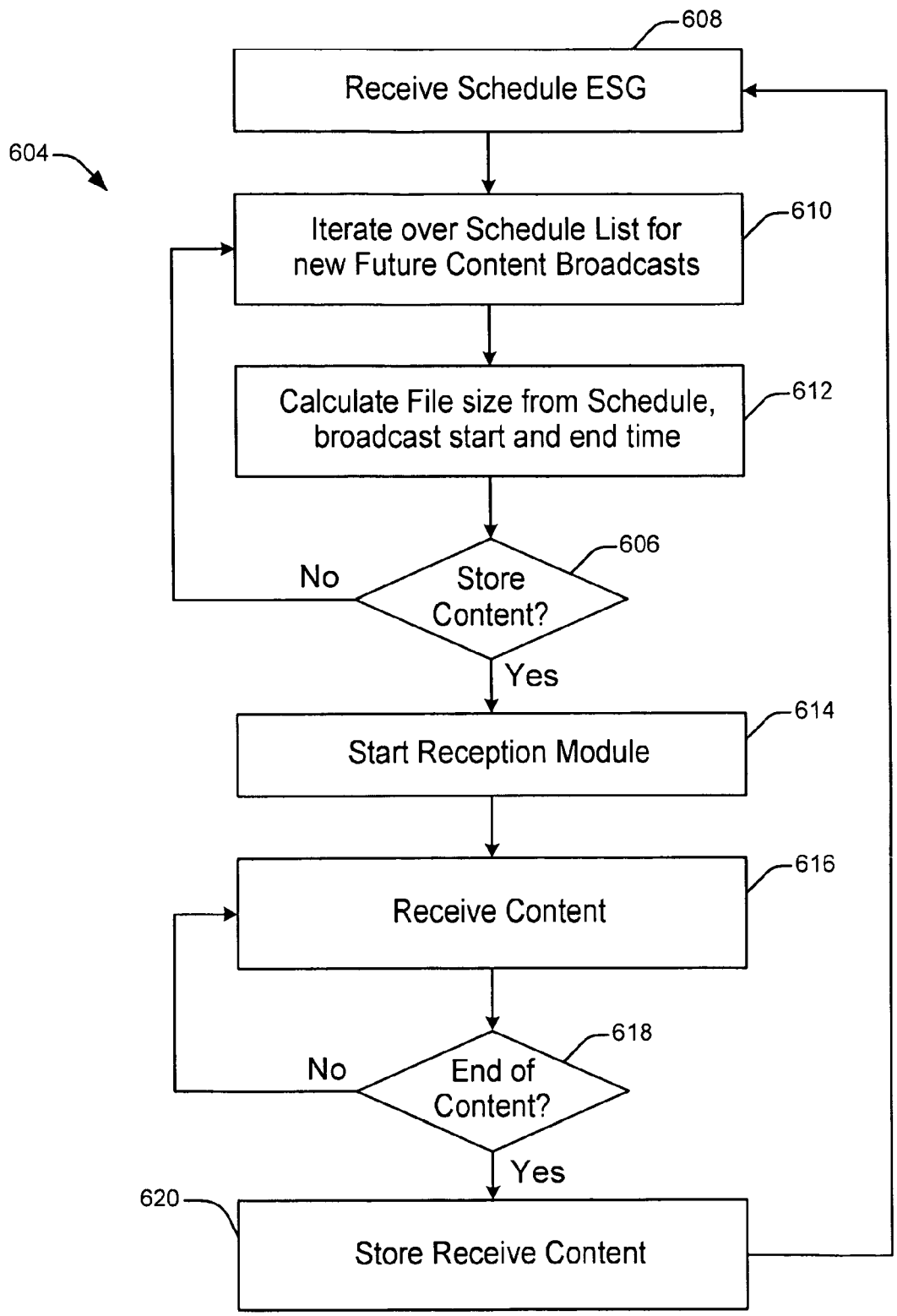
FIG. 6b is a flow diagram of the method for file size estimation according to another implementation of the present principles.

FIG. 6b shows a more detailed block diagram of steps 604 and 606 of FIG. 6a. Initially the schedule ESG is received 608. The received schedule list is iterated over or reviewed for new future content broadcasts (610). The file size is then calculated (or estimated) from the schedule information using the broadcast start and stop times (612). With this information, the client device can be presented with the decision to store, or not store the content (606). If the client device says "yes", then the reception module is powered on, and reception of the new content is started (614). The client device starts receiving the content 616, and once all the content is received (618), the content is stored 620 and the process returns to the beginning. The client device will automatically power down upon completion of the process. Generally speaking, the client device will power down if the device is not active. If the client device is in an active state, it will power down its receiving hardware components.

In accordance with one aspect of the present principles, the steps in calculating the file size over a varying or constant bandwidth channel are: From ESG:

Duration of Broadcast=EndBroadcastTime−Start-BroadcastTime.

File Size=Bandwidth of Channel*Duration of Broadcast.

It is to be understood that the present principles may be implemented in various forms of hardware, software, firmware, special purpose processors, or a combination thereof. Preferably, the present principles may be implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

The invention claimed is:

1. A method comprising:
receiving an electronic service guide (ESG) data from a server, said ESG data including a schedule list;
determining a bandwidth of a communication channel between said server and a client, said client including a reception module for storing a broadcast content from said server;
iterating over said schedule list for a new broadcast content;
estimating a size of said new content from said determined bandwidth and said schedule list, said schedule list including start and stop times of said new content;
determining whether to provide an operating power to said reception module for storing said new content at said client based upon said estimated size of said new content and a preference pre-provided by a user; and
removing said operating power from said reception module after said new content is stored when said operating power is provided to said reception module.

2. The method of claim 1 further comprising:
determining a storage space limitation of said client based upon said estimated size of said new content, wherein said preference includes storing said new content by replacing an existing content on said client.

3. The method of claim 1 further comprising:
measuring an actual size of said new content after said new content is stored;
adjusting a parameter for said bandwidth determination step in accordance with said actual size of said new content.

4. An apparatus comprising:
a client having a communication channel with a server via a network;
a memory included in said client;
a reception module included in said client operative to store a broadcast content from said server to said memory;
said client operative to:
receive an electronic service guide (ESG) data from said server, said ESG data including a schedule list;
determine a bandwidth of said communication channel between said server and said client;
iterate over said schedule list for a new broadcast content;
estimate a size of said new content from said determined bandwidth and said schedule list, said schedule list including start and stop times of said new content;
determine whether to provide an operating power to said reception module for storing said new content based upon said determined size of said new content and a preference pro-provided by a user; and
remove said operating power from said reception module after said new content is stored when said operating power is provided to said reception module.

5. The apparatus of claim 4 wherein
said client is operative to determine a storage space limitation of said memory based upon said estimated size of said new content, and
said preference includes storing said new content by replacing an existing content on said memory.

6. The apparatus of claim 4 wherein
said client is operative to measure an actual size of said new content after said new content is stored, and
said client is operative to adjust a parameter for said bandwidth determination in accordance with said actual size of said new content.

\* \* \* \* \*